United States Patent
Pano et al.

(10) Patent No.: US 6,250,854 B1
(45) Date of Patent: Jun. 26, 2001

(54) HOLDER BLADE AND INSERT POCKET OPENER

(75) Inventors: Josef Pano, Shavei Zion; Ehud Levanon, Kfar Vradim, both of (IL)

(73) Assignee: Iscar Ltd., Tefen (IL)

( * ) Notice: Subject to any disclaimer, the term of this patent is extended or adjusted under 35 U.S.C. 154(b) by 0 days.

(21) Appl. No.: 09/377,783

(22) Filed: Aug. 20, 1999

(30) Foreign Application Priority Data

Sep. 3, 1998 (IL) .................................................. 126055

(51) Int. Cl.[7] ............................ B23B 27/00; B23P 15/30
(52) U.S. Cl. .............................. 407/110; 407/117; 407/72
(58) Field of Search .................................. 407/110, 109, 407/107, 117, 72

(56) References Cited

U.S. PATENT DOCUMENTS

| | | | |
|---|---|---|---|
| 3,523,349 | * 8/1970 | Pollington et al. | 407/68 |
| 3,655,969 | * 4/1972 | Pollington et al. | 407/87 |
| 3,844,008 | * 10/1974 | Sletten | 407/88 |
| 3,939,540 | * 2/1976 | Novak | 407/107 |
| 4,456,408 | * 6/1984 | Glasow | 407/35 |
| 4,477,212 | * 10/1984 | Kraft | 407/104 |
| 5,079,979 | * 1/1992 | Pano | 407/110 X |
| 5,150,992 | * 9/1992 | Friedmann | 407/110 |
| 5,516,241 | * 5/1996 | Plutschuck et al. | 407/110 |
| 5,799,554 | * 9/1998 | Friedman et al. | 82/160 |
| 5,888,028 | * 3/1999 | Grainger et al. | 407/110 |
| 6,010,281 | * 1/2000 | Coutat et al. | 407/110 |

* cited by examiner

*Primary Examiner*—Henry Tsai
(74) *Attorney, Agent, or Firm*—Pennie & Edmonds LLP

(57) ABSTRACT

A holder blade with a leading portion and a body portion. The leading portion includes a lower jaw and an upper jaw. The upper jaw has an upper side and a clamping surface. The lower jaw and the upper jaw have a gap between them forming a cutting insert pocket. The leading portion also includes an opening extending in a generally rearward direction from the cutting insert pocket, to allow resilient displacement of the upper jaw relative to the lower jaw. The leading portion also includes a protuberance extending from the upper jaw, so that on displacing the protuberance the upper jaw is resiliently displaced and the gap between the upper and lower laws is widened.

22 Claims, 3 Drawing Sheets

HOLDER BLADE AND INSERT POCKET OPENER

FIELD OF THE INVENTION

This invention relates to a holder blade and an insert pocket opener.

BACKGROUND OF THE INVENTION

Cutting operations such as grooving and parting off are typically performed by a cutting insert retained in an insert pocket located between upper and lower jaws of a relatively narrow holder blade. The holder blade is, in turn, generally clamped in a blade retaining block. The holder blade is generally provided with an aperture, or a slot, or a slot terminating in an aperture, for resilient displacement of one of the holder blade's jaws relative to the other. For example, in U.S. Pat. No. 4,588,333 a key with two cross-pins is provided. In order to remove the insert one pin is inserted behind the insert in the insert pocket and the other pin is positioned on the top side of the holder body. The insert is pushed out of the pocket by turning the key. In U.S. Pat. No. 5,697,271 a key with a pair of prongs is provided. The clamping jaw is resiliently coupled to the body portion of the holder blade. A cutting insert can be inserted or removed by displacing the clamping jaw relative to the base jaw. In accordance with one embodiment, the clamping jaw is displaced with respect to the base jaw by positioning the prongs within a pair of apertures and turning the key.

The above referenced prior art, as well as other prior art using a similar key mechanism, require that the key be positioned at the side of the holder blade. However, there are many applications, especially when several holder blades are mounted in parallel, where there is not sufficient space to position the key at the side of the holder blade. PCT publication no. WO 97/17154 describes a way of overcoming this problem by employing a bending tool used from the front of a holder blade for displacing the clamping jaw relative to the base jaw.

The present invention proposes a novel approach for overcoming the problem of insufficient space for the positioning of a key on the side of a holder blade.

SUMMARY OF THE INVENTION

In accordance with the present invention there is provided a holder blade for a cutting insert, having a leading portion and a body portion, the leading portion comprising:
  a lower jaw;
  an upper jaw having an upper side and a clamping surface, the lower jaw and the upper jaw having a gap between them forming a cutting insert pocket;
  an opening extending in a generally rearward direction from the cutting insert pocket, thereby allowing resilient displacement of the upper jaw relative to the lower jaw; and
  a protuberance extending from the upper jaw, so that on displacing the protuberance the upper jaw is resiliently displaced and the gap between the upper and lower jaws is widened.

In accordance with the present invention there is further provided an insert pocket opener comprising:
  a front section;
  a rear section;
  a lower edge having at the front section a front protrusion and at the rear section a rear protrusion; and
  an elongated slot in the front section, extending from the lower edge rearward of the front protrusion in a generally upward direction, the slot forming forward thereof a lever in the front section of the insert pocket opener, the lever being capable of being resiliently displaced relative to the rear section.

Still further in accordance with the present invention there is provided a cutting tool assembly comprising:
  a plurality of holder blades; and
  an insert pocket opener; each holder blade of the plurality of holder blades having a leading portion and a body portion, the leading portion comprising:
  a lower jaw;
  an upper jaw having an upper side and a clamping surface, the lower jaw and the upper jaw having a gap between them forming a cutting insert pocket;
  an opening extending in a generally rearward direction from the cutting insert pocket, thereby allowing resilient displacement of the upper jaw relative to the lower jaw; and
  a protuberance extending from the upper jaw so that on displacing the protuberance the upper jaw is resiliently displaced and the gap between the upper and lower jaws is widened;
the insert pocket opener comprising:
  a front section;
  a rear section;
  a lower edge having at the front section a front protrusion and at the rear section a rear protrusion; and
  an elongated slot in the front section, extending from the lower edge rearward of the front protrusion in a generally upward direction, the slot forming forward thereof a lever in the front section of the insert pocket opener, the lever being capable of being resiliently displaced relative to the rear section.

In accordance with a preferred embodiment of the invention, the cutting tool assembly further comprises a multiple-blade retaining block wherein the plurality of holder blades is clamped.

Typically, the multiple-blade retaining block is provided with a recess for receiving therein the rear protrusion of the insert pocket opener.

In accordance with one embodiment, the width of the front protrusion is such that the front protrusion is capable of abutting the protuberance extending from the upper jaw of a single holder blade of the plurality of holder blades.

In accordance with this embodiment, the insert pocket opener is capable of opening an insert pocket of a single holder blade, from amongst the plurality of holder blades, without disturbing adjacent holder blades.

In accordance with another embodiment, the width of the front protrusion is such that the front protrusion is capable of abutting the protuberances extending from the upper jaws of at least two adjacent holder blades of the plurality of holder blades.

In accordance with this embodiment the insert pocket opener is capable of opening of insert pockets of at least two adjacent holder blades of the plurality of holder blades.

In accordance with yet another embodiment, the front protrusion is capable of abutting the protuberances extending from the upper jaws of at least two holder blades of the plurality of holder blades.

In accordance with this embodiment the insert pocket opener is capable of opening of insert pockets of at least two holder blades of the plurality of holder blades, whether they be adjacent or spaced apart.

Typically, the opening in the holder blade is an elongated slot, or an aperture, or an elongated slot terminating in a aperture.

Generally, the protuberance extends from the upper side of the upper jaw of the holder blade.

Preferably, the protuberance extends from a region rearward of the clamping surface.

Typically, the elongated slot in the insert pocket opener terminates in a aperture.

Preferably, the insert pocket opener is provided with a displacement screw threadingly connecting the lever to the rear section of the insert pocket opener, via the slot, for resilient displacement of the lever relative to the rear section.

If desired, the insert pocket opener is further provided with an adjusting screw that projects into the slot for preventing over-tightening of the displacement screw.

BRIEF DESCRIPTION OF THE DRAWINGS

For a better understanding the invention will now be described, by way of example only, with reference to the accompanying drawings in which.

DETAILED DESCRIPTION OF THE INVENTION

Figure 1:
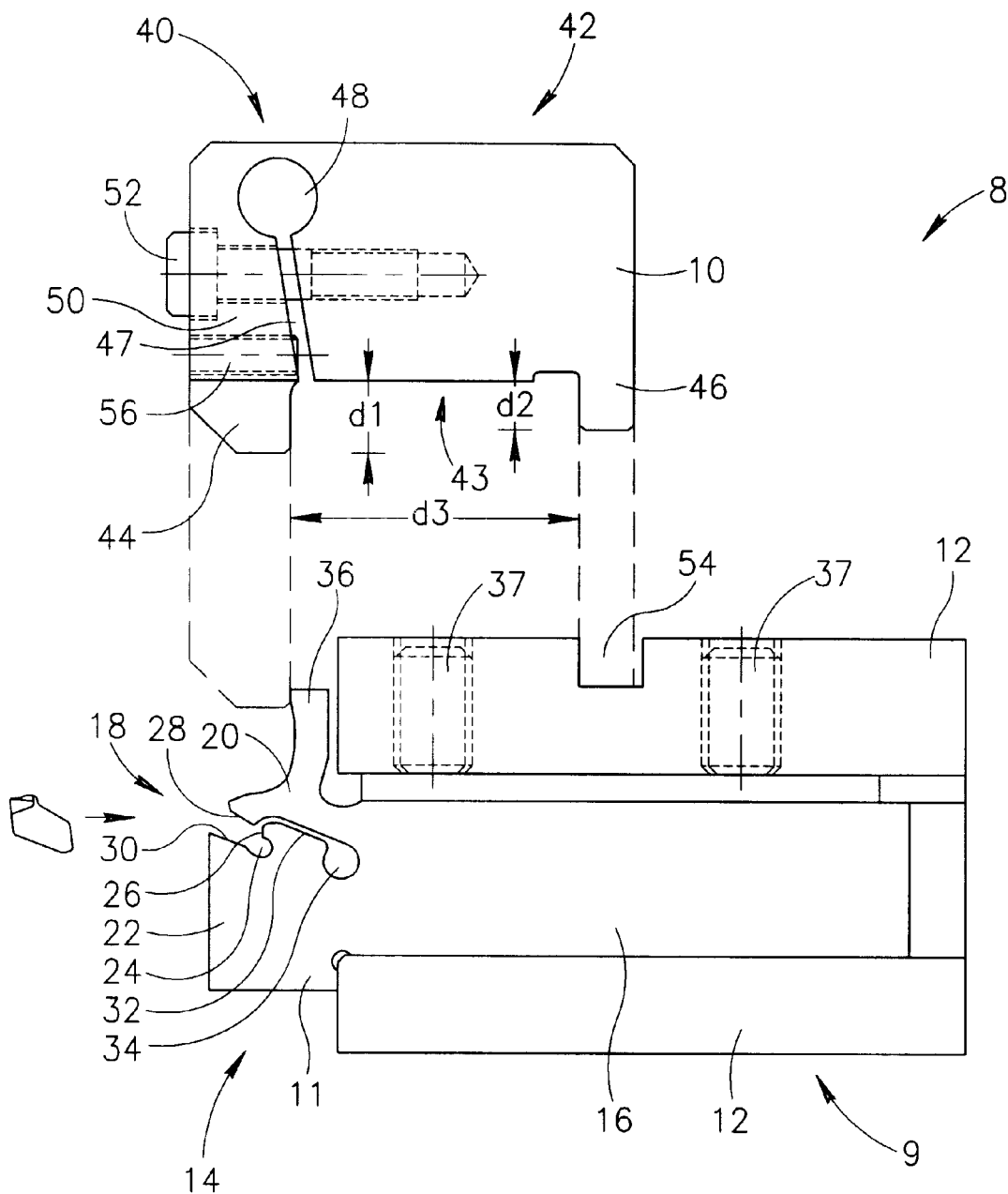
FIG. 1 shows a side view of a cutting tool assembly in accordance with the present invention.

Attention is first drawn to FIG. 1 showing a side view of a cutting tool assembly 8 comprising a cutting tool unit 9 and an insert pocket opener 10, in accordance with the present invention. The cutting tool unit 9 comprises a holder blade 11 and a blade retaining block 12. The holder blade 11 comprises a leading portion 14 and a body portion 16. Formed in the leading portion 14 is an open ended insert pocket 18 for receiving a cutting insert 19. The insert pocket 18 is situated between upper and lower jaws 20 and 22, respectively, and an pocket back end aperture 24 adjacent an insert location surface 26. The upper and lower jaws 20 and 22 have clamping surfaces 28 and 30, respectively.

Extending in a generally rearward direction from between the insert location surface 26 and the clamping surface 28 is an elongated slot 32 terminating in an aperture 34. This arrangement allows the upper jaw 20 to be resiliently displaced relative to the lower jaw 22. It will be appreciated by those skilled in the art, that resilience can also be achieved by using any suitable opening. For example, the opening can be just a slot, or just an aperture. The spacing between the clamping surfaces 28 and 30 is somewhat smaller than the largest height of the cutting insert 19, taken at the region where the insert is clamped. Therefore, after insertion of the cutting insert 19 into the insert pocket 18, a resilient force applied by the upper jaw 20 to cutting insert 19 ensures that it is retained in place.

The essential feature of the present invention is a protuberance 36, extending from the upper jaw 20 of the blade holder 11. For the blade holder 11 shown in the figures, the protuberance 36 extends from the upper side of upper jaw 20, typically from a region rearward of clamping surface 28, preferably forward of the aperture 34 and in a generally upward direction.

The holder blade 11 is clamped, at its body portion 16, in a blade retaining block 12, by means of top clamping screws 37. No detailed description of the method of clamping of the holder blade in the blade retaining block will be given since it is not pertinent to the present invention and since such methods are well known in the art. The holder blade 11 and the blade retaining block 12 form together a cutting tool unit 9. The holder blade 11 is of a substantially rectangular shape and is of relatively narrow thickness, at least at its leading portion.

The insert pocket opener 10 is of substantially rectangular shape and comprises a front section 40 and a rear section 42. The insert pocket opener has a lower edge 43 which is provided at the front section 40 with a front protrusion 44 and at the rear section 42 with a rear protrusion 46. The front and rear protrusions protrude from the lower edge by distances d1 and d2, respectively, and are spaced apart from one another by distance d3, d3 being greater than either d1 or d2. The insert pocket opener is further provided, at its front section 40, with an elongated slot 47 extending from the lower edge 43 of the insert pocket opener, to the rear of the front protrusion 44, in a generally upward and preferably slightly forward direction and terminating in an aperture 48. By this construction a lever 50 is formed in the front section 40 of the insert pocket opener 10 which can be resiliently displaced in a rearward direction. In accordance with one embodiment there is provided a displacement screw 52 which threadingly connects the lever 50 to the rear section 42 of the insert pocket opener 10 via the slot 47. On tightening the displacement screw 52 the lever 50 and the rear section 42 are brought closer together as the width of the slot 47 gets smaller, thereby resiliently displacing the lever 50 in a rearward direction relative to the rear section 42 of the insert pocket opener.

Figure 2:
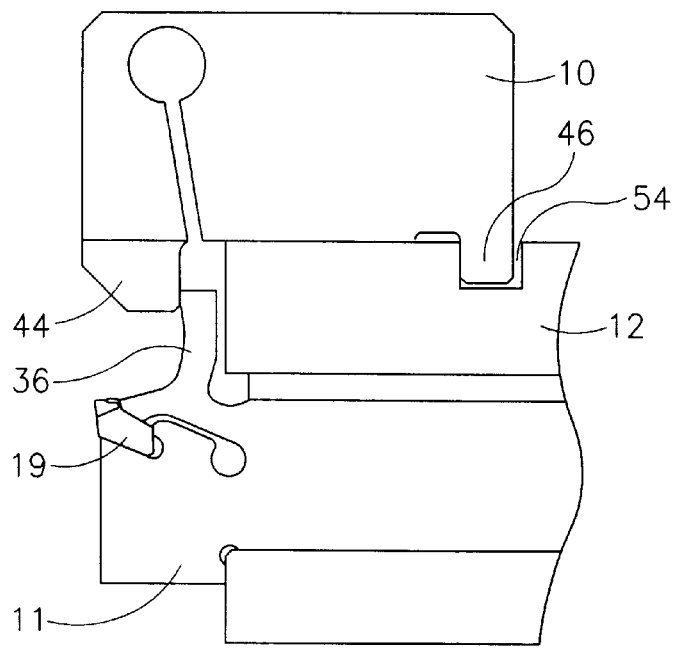
FIG. 2 shows a partial side view of the cutting tool assembly shown in FIG. 1 with the insert pocket opener in position before opening the insert pocket.
Figure 3:
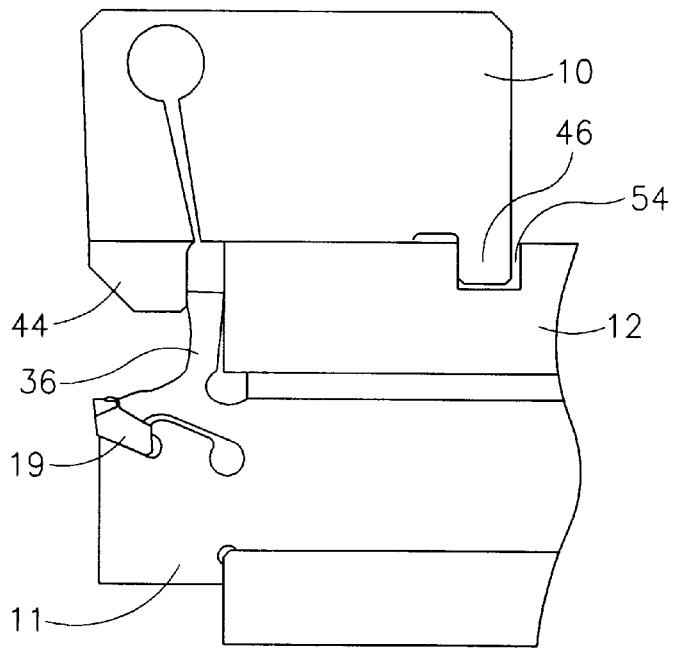
FIG. 3 shows a partial side view of the cutting tool assembly shown in FIG. 1 with the insert pocket opener in position after opening the insert pocket.

Reference will now be made, in addition to FIG. 1, to FIGS. 2 and 3 of the drawings which illustrate the method of opening the insert pocket 18 for the removal, or insertion, of an insert 19. As shown in FIG. 1, by the broken lines, the insert pocket opener 10 can be brought into contact with the cutting tool unit 9, with the front protrusion 44 abutting the protuberance 36 at an abutment surface 36a formed on an upper forward portion thereof (see FIG. 2) and with the rear protrusion 46 abutting the blade retaining block 12 at the front end of a recess 54 therein. As the displacement screw 52 (not shown in FIGS. 2 and 3) is tightened the width of the slot 47 decreases and the lever 50 is displaced in a rearward direction applying a rearwardly directed force to the abutment surface 36a of the protuberance 36, which is counteracted by the rear protrusion 46 as it abuts the front end of the recess 54 of the blade retaining block 12. As the lever 50 moves in a rearward direction the gap between the clamping surfaces 28 and 30 increases so that the insert pocket 18 opens. Once the insert has been removed, or inserted, the displacement screw 52 can be untightened, whereby the lever 50 returns to its original position releasing the protuberance 36, and the insert pocket 18 closes due to the resilience of the upper jaw 20.

Figure 4:
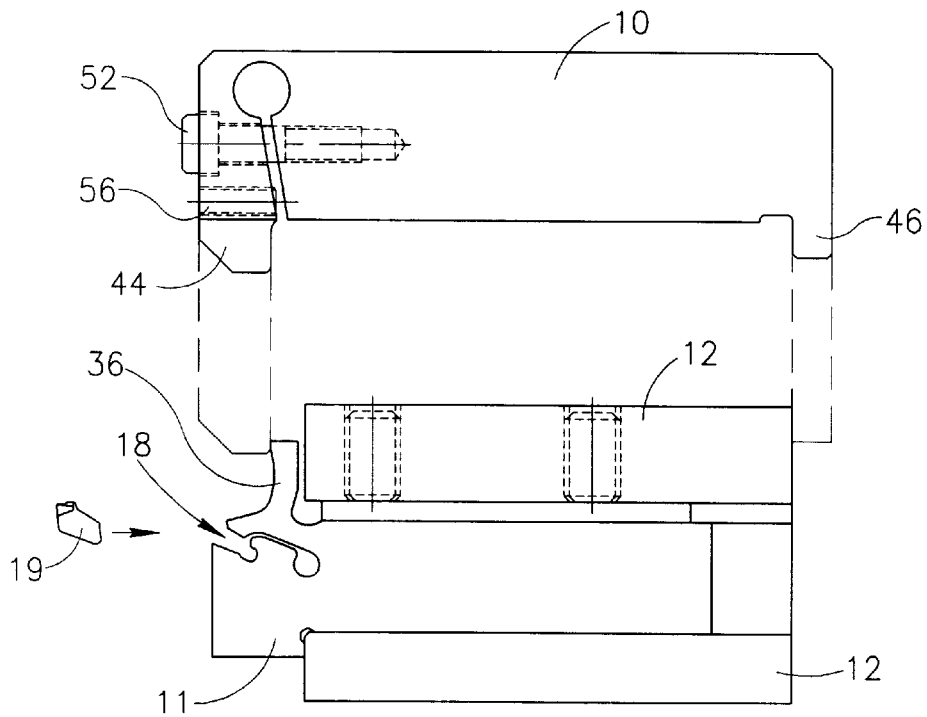
FIG. 4 shows a side view of a cutting tool assembly in accordance with the present invention without a recess in the blade retaining block.

There is no constraint as to the actual location of the recess 54, except that it is preferable that it not be located too close to the front of the blade retaining block 12. As shown in FIG. 4, the recess 54 can be done away with completely, in which case the rear protrusion 46 can abut the blade retaining block 12 at its upper rear end.

If desired, a safety device such as an adjusting screw 56 can be provided adjacent displacement screw 52. The adjusting screw projects into the slot 47, a predetermined distance, preventing the over-tightening of displacement screw 52. This serves to protect the insert pocket 18, which may be damaged if over opened.

Figure 5:
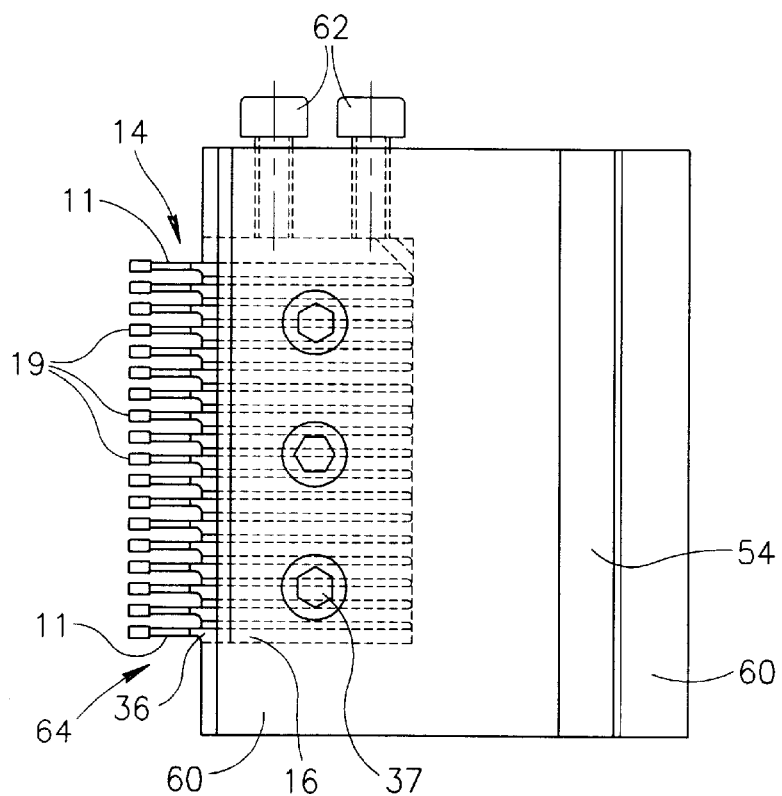
FIG. 5 shows a top view of a cutting tool assembly in accordance with the present invention with a plurality of parallelly positioned holder blades clamped in a multiple-blade retaining block.

As already pointed out, the present invention finds particular application to those scenarios in which there is insufficient space for the positioning of a key on the side of the holder blade. This is particularly the case when several holder blades are mounted in parallel and wherein the distance between the blades is relatively small. Attention is now drawn to FIG. 5 showing a top view of a plurality of holder blades 11 clamped parallelly side by side in a multiple-blade retaining block 60 by means of top clamping screws 37 and side clamping screws 62. Eighteen holder blades are shown with cutting inserts 19 retained therein. Also seen in the top view, are the protuberances 36. The holder blades 11 and multiple-blade retaining block 60 form-together a cutting tool unit 64. As in FIG. 1, the leading portions 14 of the holder blades protrude from the front of the multiple-blade retaining block 60.: However, the length of the body portion 16 is a matter of convenience and as shown in FIG. 5 the body portions do not reach the recess 54 in the top surface of the retaining block 60, in contrast to the situation in FIG. 1. Furthermore, it is possible to do away with the recess 54 as shown in FIG. 4 for the retaining block 12.

The insert pocket opener 10, shown in FIG. 1, for use with cutting tool unit 9, can also be used with cutting tool unit 64 shown in FIG. 5. The width of the insert pocket opener determines the number of insert pockets that can be opened simultaneously. If the width of the insert pocket opener is substantially the same as the width of a single holder blade, then the insert pocket of a single holder blade can be opened without affecting the insert pockets of adjacent holder blades. In fact, for this form of operation it is sufficient that the width of the front protrusion 44 of the insert pocket opener be substantially that of a single holder blade, the width of the remainder of the insert pocket opener is inconsequential. In a similar fashion, any required number of insert pockets can be opened simultaneously by designing the front protrusion 44 of the insert pocket opener to be wide enough so that it can come into abutment with the protuberances 36 of the required number of holder blades.

Although the present invention has been described to a certain degree of particularity, it should be understood that various alterations and modifications can be made without departing from the spirit or scope of the invention as hereinafter claimed. Therefore, it will be appreciated that any suitable device can be used to apply a rearwardly directed force to the protuberance 36 in order to open the insert pocket 18. For example, a lever, hollow at least at one end, could be used. In order to open the insert pocket the lever would be positioned in such a way that the protuberance 36 is retained in the hollow of the hollow end of the lever and then the lever would be moved in the rearward direction, thereby forcing the lever to move in the rearward direction resulting in the opening of the insert pocket 18.

What is claimed is:

1. A holder blade having a leading portion and a body portion, the leading portion comprising:
    a lower jaw;
    an upper jaw having an upper side and a clamping surface, the lower jaw and the upper jaw having a gap between them forming a cutting insert pocket;
    an opening extending in a generally rearward direction from the cutting insert pocket, thereby allowing resilient displacement of the upper jaw relative to the lower jaw; and
    a protuberance extending in a generally upward direction from the upper jaw and being provided with an abutment surface, so that on displacing the protuberance rearwardly at its abutment surface, the upper jaw is resiliently displaced and the gap between the upper and lower jaws is widened.

2. The holder blade in accordance with claim 1, wherein the opening is an elongated slot.

3. The holder blade in accordance with claim 1, wherein the opening is an aperture.

4. The holder blade in accordance with claim 1, wherein the opening is an elongated slot terminating in an aperture.

5. The holder blade in accordance with claim 1, wherein the protuberance extends from the upper side of the upper jaw of the holder blade.

6. The holder blade in accordance with claim 5, wherein the protuberance extends from a region rearward of the clamping surface.

7. An insert pocket opener comprising:
    a front section;
    a rear section;
    a lower edge having at the front section a front protrusion and at the rear section a rear protrusion, the front and rear protrusions protruding from the lower edge by respective first and second distances, and being spaced apart from one another by a third distance greater than said first and second distances;
    an elongated slot in the front section, extending from the lower edge rearward of the front protrusion in a generally upward direction, the elongated slot forming forward thereof a lever in the front section of the insert pocket opener, the lever being capable of being resiliently displaced relative to the rear section; and
    a displacement screw passing through the elongated slot and threadingly connecting the lever to the rear section of the insert pocket opener, via the elongated slot, for resilient displacement of the lever relative to the rear section.

8. The insert pocket opener in accordance with claim 7, wherein the elongated slot terminates in an aperture.

9. The insert pocket opener in accordance with claim 7, further comprising an adjusting screw that projects into the slot for preventing over-tightening of the displacement screw.

10. A cutting tool assembly comprising:
    a plurality of holder blades; and
    an insert pocket opener;
    each holder blade of the plurality of holder blades having a leading portion and a body portion, the leading portion comprising:
    a lower jaw;
    an upper jaw having an upper side and a clamping surface, the lower jaw and the upper jaw having a gap between them forming a cutting insert pocket;

an opening extending in a generally rearward direction from the cutting insert pocket, thereby allowing resilient displacement of the upper jaw relative to the lower jaw; and a protuberance extending in a generally upward direction from the upper jaw and being provided with an abutment surface so that on displacing the protuberance rearwardly at its abutment surface, the upper jaw is resiliently displaced and the gap between the upper and lower jaws is widened;

the insert pocket opener comprising:

a front section;

a rear section;

a lower edge having at the front section a front protrusion and at the rear section a rear protrusion;

an elongated slot in the front section, extending from the lower edge rearward of the front protrusion in a generally upward direction, the elongated slot forming forward thereof a lever in the front section of the insert pocket opener, the lever being capable of being resiliently displaced relative to the rear section; and a displacement screw passing through the elongated slot and threadingly connecting the lever to the rear section of the insert pocket opener, via the elongated slot, for resilient displacement of the lever relative to the rear section.

11. The cutting tool assembly in accordance with claim 10, further comprising a multiple-blade retaining block wherein the plurality of holder blades is clamped.

12. The cutting tool assembly in accordance with claim 11, wherein the multiple-blade retaining block is provided with a recess for receiving therein the rear protrusion of the insert pocket opener.

13. The cutting tool assembly in accordance with claim 10, wherein the width of the front protrusion is such that the front protrusion is capable of abutting the protuberance extending from the upper jaw of a single holder blade of the plurality of holder blades.

14. The cutting tool assembly in accordance with claim 10, wherein the width of the front protrusion is such that the front protrusion is capable of abutting the protuberances extending from the upper jaws of at least two adjacent holder blades of the plurality of holder blades.

15. The cutting tool assembly in accordance with claim 10, wherein the front protrusion is capable of abutting the protuberances extending from the upper jaws of at least two holder blades of the plurality of holder blades.

16. The cutting tool assembly in accordance with claim 10, wherein the slot terminates in an aperture.

17. The cutting tool assembly in accordance with claim 10, further comprising an adjusting screw that projects into the slot for preventing over-tightening of the displacement screw.

18. The cutting tool assembly in accordance with claim 10, wherein the opening is an elongated slot.

19. The cutting tool assembly in accordance with claim 10, wherein the opening is an aperture.

20. The cutting tool assembly in accordance with claim 10, wherein the opening is an elongated slot terminating in an aperture.

21. The cutting tool assembly in accordance with claim 10, wherein the protuberance extends from the upper side of the upper jaw of the holder blade.

22. The cutting tool assembly in accordance with claim 21, wherein the protuberance extends from a region rearward of the clamping surface.

* * * * *